(12) United States Patent
Imboden et al.

(10) Patent No.: US 12,736,917 B2
(45) Date of Patent: Sep. 15, 2026

(54) TIMEPIECE MECHANISM PROVIDED WITH A MAGNETIC GEAR

(71) Applicant: The Swatch Group Research and Development Ltd, Marin (CH)

(72) Inventors: Matthias Imboden, St-Blaise (CH); Jean-Pierre Mignot, Pontarlier (FR); Cédric Nicolas, Neuchâtel (CH); Nicolas Livat, Cressier (CH)

(73) Assignee: The Swatch Group Research and Development Ltd, Marin (CH)

( * ) Notice: Subject to any disclaimer, the term of this patent is extended or adjusted under 35 U.S.C. 154(b) by 945 days.

(21) Appl. No.: 18/081,219

(22) Filed: Dec. 14, 2022

(65) Prior Publication Data

US 2023/0205136 A1 Jun. 29, 2023

(30) Foreign Application Priority Data

Dec. 23, 2021 (EP) .................................... 21217315

(51) Int. Cl.
*G04B 13/02* (2006.01)
*F16H 49/00* (2006.01)

(52) U.S. Cl.
CPC ........... *G04B 13/02* (2013.01); *F16H 49/005* (2013.01)

(58) Field of Classification Search
CPC ...... G04B 13/02; G04B 13/00; G04B 13/027; F16H 49/005; F16H 1/206;
(Continued)

(56) References Cited

U.S. PATENT DOCUMENTS 2,243,555 A * 5/1941 Faus .................... H02K 49/102 74/460
3,523,204 A * 8/1970 Sydney ................ H02K 49/102 310/94
(Continued)

FOREIGN PATENT DOCUMENTS

CH 709059 A2 * 6/2015 ........... H02K 49/102
CH 711 932 A2 6/2017
(Continued)

OTHER PUBLICATIONS

Search Report dated May 20, 2022, in corresponding European Patent Application No. EP 21 21 7315.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A mechanism (1) including a magnetic gear (2) including a first wheel (6A) and a second wheel (6B), the first wheel (6A) being provided with first permanent magnetic poles (7) forming first magnetic toothing (8), the second wheel (6B) being provided with a second magnetic toothing (10) made of a ferromagnetic material, the first wheel (6A) and the second wheel (6B) being arranged such that the first magnetic toothing has a first magnetic coupling with the second magnetic toothing (10). The gear (2) has a third wheel (6C) having second permanent magnetic poles (9) which form a third magnetic toothing (12), the third wheel and the second wheel being arranged such that the third magnetic toothing has a second magnetic coupling with the second magnetic toothing; the magnetic gear (2) being arranged such that the first and third wheels are each angularly positioned in a specific manner.

20 Claims, 4 Drawing Sheets

(58) Field of Classification Search
CPC ..... F16H 37/0826; G04C 5/005; G04C 3/105; G01D 5/04; H02K 49/104
USPC .......................................................... 368/327
See application file for complete search history.

(56) References Cited

U.S. PATENT DOCUMENTS

| | | | | |
|---|---|---|---|---|
| 6,559,569 | B2 * | 5/2003 | Aoshima | H02P 8/30 310/112 |
| 2004/0000829 | A1 * | 1/2004 | McVicar | H02K 7/116 310/75 R |
| 2020/0076289 | A1 * | 3/2020 | Lewis | H02K 51/00 |

FOREIGN PATENT DOCUMENTS

| | | | | | |
|---|---|---|---|---|---|
| EP | 2 889 701 | B1 | | 7/2017 | |
| EP | 2 889 704 | B1 | | 11/2017 | |
| EP | 2 894 522 | B1 | | 1/2019 | |
| FR | 875409 | A | | 9/1942 | |
| IT | 102013902157490 | A1 | | 11/2014 | |
| JP | 2000291779 | A | * | 10/2000 | |
| JP | 2005253292 | A | * | 9/2005 | |
| JP | 2007-92849 | A | | 4/2007 | |
| JP | 2019117682 | A | * | 7/2019 | |
| JP | 2020148323 | A | * | 9/2020 | F16H 57/023 |
| WO | WO-2007037257 | A1 | * | 4/2007 | H02K 49/102 |

* cited by examiner 2
6B
10
1
14
7
6A
22A
9
22C
6C
26
VIII
24
32
8
22B
34
12
38
24
VIII 32
34
38
1
14
26
22A
22B
22C
6C
24
7
6A
20A
6B
28
20C
9
24

6B
30
24
43
40A
8
22A
32
6A
2
1
7
44
14
26
10
24
22B
20B
43
9
22C
38
34
36
6C
24
12
40C

TIMEPIECE MECHANISM PROVIDED WITH A MAGNETIC GEAR

CROSS REFERENCE TO RELATED APPLICATIONS

This application claims priority from European Patent Application No. 21217315.7 filed Dec. 23, 2021, the contents of all of which are incorporated herein by reference in their entirety.

TECHNICAL FIELD OF THE INVENTION

The invention relates to the field of magnetic gears formed by a first wheel and a second wheel meshing with one another magnetically.

In particular, the invention relates to a mechanism, in particular a timepiece mechanism, incorporating such a magnetic gear. The invention further relates to a timepiece comprising such a mechanism. Such a timepiece can in particular be a wristwatch.

TECHNOLOGICAL BACKGROUND

Magnetic gears are known devices that can be used to transfer mechanical torque between two parts without any direct contact between the parts, and thus without resulting in wear or friction therebetween. Such gears provide the following benefits:

- no oil or lubricant is required since there is no mechanical wear on the teeth of the parts;
- the toothed parts can interact and transfer torque and mechanical power, even if they are hermetically separated; and
- the toothed parts can be used to limit the maximum torque, and can thus help to avoid damage, for example in the event of a mechanical impact.

Such a magnetic gear typically includes two wheels that mesh with one another magnetically. A first wheel is provided with first permanent magnetic poles, which are typically alternating and arranged in a circle and define a first magnetic toothing. These first magnetic poles are, for example, defined by bipolar magnets with radial and preferably alternating magnetisation. A second wheel is provided with teeth made of a soft ferromagnetic material or second magnetic poles, that are for example defined by bipolar magnets also having alternating polarities, these teeth or second magnetic poles being arranged in a circle and defining a second magnetic toothing. The first and second wheels are typically located in the same general plane, although superimposed toothings are possible when they are both formed by permanently magnetised poles. The magnetic coupling between the toothings of the first and second wheels means that when one of these first and second wheels is driven such that it rotates, the other wheel is also driven such that it rotates. A mechanical torque is thus transmitted in the magnetic gear, which overall corresponds to the function of a gear.

However, one drawback of this type of magnetic gear is that the maximum mechanical torque that can be transferred between the two wheels (without slippage or sliding in the gear) is limited by various factors. There is thus a need for a magnetic gear with a higher maximum transferable mechanical torque.

For this purpose, one intuitive solution consists of using wheels with larger tooth diameters and of minimising the distance between the two wheels. The magnetic interaction intended to take place between the teeth of the two wheels, however, prevents any possibility of providing a sufficiently narrow spacing between adjacent teeth of either of the two wheels. Bringing the two toothings to a very short distance from one another without them making contact poses a real problem in terms of tolerances. Within the scope of the invention, two main issues linked to magnetic gears have been identified. A first main issue arises from the fact that a positioning torque (parasitic magnetic torque) is periodically exerted on the rotating drive wheel. The term "magnetic torque" is understood to mean a magnetic force couple. The positioning torque to be overcome is a phenomenon that results from the fact that a minimum energy is present in the magnetic gear when the two wheels have two respective teeth that are aligned. The positioning torque works to bring the two wheels into a position of minimum energy. In operation, it thus periodically opposes the rotation of the drive wheel. This parasitic magnetic torque can be high, possibly as high as (or even higher than) the mechanical torque that can be transmitted between the two wheels of the magnetic gear. In order to overcome this disruptive torque, a motor device driving one of the two wheels must be able to provide a force couple that is much greater than the mechanical force couple transmitted in the magnetic gear, which unnecessarily increases the power consumption of this motor. In any case, and assuming that the first wheel is a drive wheel and that the second wheel is driven by the first wheel, it is possible for the transferable mechanical torque to not be limited by the magnetic interaction between the wheels, but by the minimum mechanical torque originating from the first wheel. In the typical magnetic gear considered here, the mechanical torque to be provided by the first wheel must be equal to the maximum positioning torque (parasitic magnetic torque) plus the mechanical torque to be transmitted in/through the magnetic gear.

The second important issue, which is mainly addressed by the present invention, is that the maximum mechanical torque that can be transferred in the aforementioned typical magnetic gear is limited by a modulation of the magnetic torque occurring in the magnetic gear when it is in operation. More specifically, when the two wheels rotate, the two respective magnetic toothings thereof pass alternately from a first situation, wherein a magnetic tooth of one of these two magnetic toothings is aligned along an axis passing through the centres of the two wheels, to a second situation wherein two adjacent magnetic teeth of this magnetic toothing are in symmetrical angular positions relative to this axis passing through the centres of the two wheels. A decrease is observed in the magnetic torque exerted by the drive wheel on the driven wheel between the first situation and the second situation, and thus a variation is observed in the maximum mechanical torque that can be transferred in the gear. Thus, the maximum mechanical torque transmitted in the gear is limited by the minimum magnetic torque between the two wheels when they are rotated.

SUMMARY OF THE INVENTION

The purpose of the invention is thus to overcome the drawbacks of the prior art identified hereinabove by providing a mechanism, in particular a timepiece mechanism, comprising a magnetic gear that is simple to manufacture and mount in the mechanism, in particular with regard to the manufacturing and relative positioning tolerances of the magnetic toothings, and which makes it possible to increase the maximum mechanical torque that can be transferred in the gear (without one wheel slipping relative to the other in this gear).

For this purpose, the present invention relates to a mechanism, in particular a timepiece mechanism, comprising a magnetic gear including a first wheel and a second wheel. The first wheel is provided with first permanent magnetic poles which are arranged so as to form the magnetised teeth of a first magnetic toothing from which first magnetic fluxes having alternating polarities respectively emerge, and the second wheel is provided with teeth made of a soft ferromagnetic material defining a second magnetic toothing, the first wheel and the second wheel being arranged such that the first magnetic toothing has a first magnetic coupling with the second magnetic toothing generated by the first magnetic fluxes which momentarily polarise in magnetic attraction, teeth of the second magnetic toothing, which are momentarily located in a first magnetic coupling zone with the first magnetic toothing and thus through which first magnetic fluxes from among said first magnetic fluxes respectively flow, such that the first and second wheels magnetically mesh with one another, the magnetic gear defining a first reference half-axis starting from the rotational axis of the second wheel and intercepting the rotational axis of the first wheel. According to the invention, the magnetic gear further comprises a third wheel provided with second permanent magnetic poles which are arranged so as to form the magnetised teeth of a third magnetic toothing from which second magnetic fluxes with alternating polarities respectively emerge. The third wheel and the second wheel are arranged such that the third magnetic toothing has a second magnetic coupling with the second magnetic toothing generated by said second magnetic fluxes which momentarily polarise, in magnetic attraction, teeth of the second magnetic toothing, which are momentarily located in a second magnetic coupling zone with the third magnetic toothing and thus through which second magnetic fluxes from among said second magnetic fluxes respectively flow, such that the second and third wheels magnetically mesh with one another, the magnetic gear defining a second reference half-axis starting from the rotational axis of the second wheel and intercepting the rotational axis of the third wheel. The first reference half-axis and the second reference half-axis have a given angle $\phi$ therebetween. The first permanent magnetic poles (thus the magnetised teeth/magnetic toothing) of the first wheel have a first phase relative to the first reference half-axis, and the second permanent magnetic poles (thus the magnetised teeth/magnetic toothing) of the third wheel have a second phase relative to the second reference half-axis. The magnetic gear is arranged such that a phase shift between the first and third wheels, defined as the difference between said first and second phases, is constant at all times. The angle $\phi$ and the phase shift are selected so as to substantially determine the value of a maximum mechanical torque that can be transferred in the magnetic gear without slippage in this magnetic gear, i.e. without slippage occurring between the second wheel and the first and third wheels.

The phase of the first wheel, respectively of the third wheel, i.e. the phase of the first permanent magnetic poles, respectively of the second permanent magnetic poles (i.e. of the magnetised teeth of the first magnetic toothing, respectively of the third magnetic toothing), is defined, at a given moment in time, by the angle of one of these permanent magnetic poles (of one of these magnetised teeth), relative to the first half-axis, respectively to the second half-axis, modulo the angular period of the first magnetic toothing, respectively of the third magnetic toothing (i.e. the angular distance between two adjacent magnetised teeth of this magnetic toothing), the whole divided by this angular period and multiplied by 360°. A phase shift is given by a difference of two phases. It should be noted that a phase shift $\beta$ is identical to a phase shift $\beta-360°$. Thus, a phase shift whose value changes, depending on the instantaneous values of the two phases considered, from $\beta$ to $\beta-360°$, in either direction, remains a constant phase shift (for example, a phase shift equal to 90° and a phase shift equal to −270° define one and the same phase shift, such that a phase shift whose value varies between these two values is a constant phase shift).

In general, providing, in the magnetic gear, a third wheel provided with permanent magnetic poles and magnetically coupled to the second wheel, allows a maximum mechanical torque that can be transferred without slippage in the gear to be selected by adequately selecting, for this purpose, said angle $\phi$ and said phase shift. In particular, the third wheel allows the maximum mechanical torque that can be transferred without slippage in the magnetic gear (in other words without disengagement in the kinematic connection provided for this gear, i.e. in the magnetic meshing between the second wheel and the first and third wheels) to be increased for a given motor torque. Such an advantage arises from the fact that the maximum total magnetic torque in the magnetic gear varies significantly as a function of the angular offset $\alpha$ between the first and third wheels and as a function of said phase shift between the first and third wheels. The angular offset $\alpha$ is defined as being equal to the aforementioned angle $\phi$ modulo the period $P_2$ of the magnetic toothing of the second wheel. Moreover, such a magnetic gear with two wheels having magnetised teeth magnetically coupled to another wheel with teeth made of a ferromagnetic material provides more mechanical torque for keeping all of the wheels stationary, regardless of the angular positions of the wheels of the magnetic gear at rest. This is particularly advantageous in the case of a dynamic, limited-inertia mechanism.

Preferably, the angle $\phi$ and the phase shift between the first and third wheels are selected such that the maximum transferable mechanical torque, i.e. without one wheel slipping on the other in the magnetic gear, is more than twice a corresponding maximum mechanical torque that can be transferred by another magnetic gear that includes only the first wheel and the second wheel. More specifically, each of the first and third wheels is limited, for the maximum transferable mechanical torque, by the minimum of the magnetic torque between this wheel and the second wheel as a function of the angular position of either of these two wheels, this minimum determining a maximum value for the mechanical torque that can be transferred from one wheel to the other. However, when the first and third wheels have an adequately-selected angular offset and phase shift, an offset is seen between the two minima of the two respective magnetic torques such that the minimum of the two magnetic torques added together (total magnetic torque) can be more than double the minimum for only one of the two magnetic torques. This property is remarkable.

In an advantageous alternative, the first magnetic toothing and the third magnetic toothing each include the same number N1 of teeth, and the first and third wheels are angularly positioned, relative to the rotational axis of the second wheel, in such a way that said angle $\phi$ satisfies the mathematical relationship:

$$\left(N-\frac{2}{3}\right)\cdot\frac{360°}{N2}\leq\Phi=\Phi(N)\leq\left(N-\frac{1}{3}\right)\cdot\frac{360°}{N2}$$

where N2 is the number of teeth in the second magnetic toothing (10) and N is a positive integer less than N2. This range of values for the angle φ(N) procures good results in terms of the maximum transferable mechanical torque for the gear (for certain ranges of the phase shift between the permanent magnetic poles of the first and third wheels associated with the values of the value range respectively).

Preferably, the value of the angle φ(N) is selected to be substantially equal to $$\left(N-\frac{1}{2}\right)\cdot\frac{360^\circ}{N2}$$

This optimum value for the angle φ(N) procures the best results in terms of the maximum transferable mechanical torque for the gear (for a certain range of the phase shift between the permanent magnetic poles of the first and third wheels about an optimum phase shift defined hereinbelow). Typically, the optimum value of the angle φ(N) can give, for certain values of the phase shift between the permanent magnetic poles of the first and third wheels, a maximum transferable mechanical torque that is more than twice the maximum transferable mechanical torque produced by another gear including only the first wheel and the second wheel.

In another advantageous alternative, the first magnetic toothing and the third magnetic toothing each also include the same number N1 of teeth, two specific teeth respectively belonging to these first and third magnetic toothings having, relative to the respective first and second half-axes and at all times, a given constant angular difference ψ. The first and third wheels are angularly positioned, relative to the respective first and second half-axes, such that the angular difference ψ satisfies the mathematical relationship:

$$\left(M-\frac{2}{3}\right)\cdot\frac{360^\circ}{N1}\leq\Psi=\Psi(M)\leq\left(M-\frac{1}{3}\right)\cdot\frac{360^\circ}{N1}$$

where M is a positive integer less than N1 which depends on the two specific teeth, i.e. those selected to measure the angular difference. This range of values for the angular difference ψ(M) procures good results in terms of the maximum transferable mechanical torque for the gear (for certain ranges of the angular offset between the first and third wheels associated with the values of the value range respectively).

Preferably, the value of the angular difference ψ(M) is selected to be substantially equal to $$\left(M-\frac{1}{2}\right)\cdot\frac{360^\circ}{N1}$$

This optimum value for the angular difference ψ(M) procures the best results in terms of the maximum transferable mechanical torque for the gear (for a certain range of the angular offset between the first and third wheels about an optimum angular offset corresponding to the optimum angle φ(N) for all N). Typically, this optimum value of ψ(M) can give, for certain values of the angular offset of the first and third wheels, a maximum transferable mechanical torque that is more than twice the maximum transferable mechanical torque produced by another gear including only the first wheel and the second wheel. The angular phase shift is defined as the angular difference ψ(M) modulo the period of the first toothing (equal to that of the third toothing). The angular phase shift δ is thus identical for all M. Similarly, the angular offset α, mentioned hereinabove, is identical for all N. The combination of the preferred/optimum angular offset α, corresponding to the optimum angle φ(N) for all N, and of the preferred/optimum angular phase shift δ, corresponding to the preferred/optimum angular difference ψ(M) for all M, gives the best result in terms of maximum transferable mechanical torque.

According to one example embodiment of the invention, the first and third wheels are disposed substantially on either side of the second wheel, the second wheel thus being arranged substantially between the first and third wheels. This balances the magnetic radial forces acting on the second wheel.

In an advantageous alternative, the first and third wheels are drive wheels and the second wheel is driven.

According to one example embodiment of the invention, the magnetised teeth of the first toothing, respectively of the third toothing, are arranged such that the first magnetic fluxes, respectively the second magnetic fluxes, emerge from these magnetised teeth in a main direction which is radial relative to the rotational axis of the first wheel, respectively of the third wheel.

According to a first specific embodiment, the mechanism further includes two motors, preferably two Lavet motors, the rotor of each of the two motors being kinematically connected to a respective wheel of the first and third wheels, in order to drive said respective wheel such that it rotates, the two motors being configured to drive the first and third wheels at least in part simultaneously.

According to a second specific embodiment, the mechanism further includes one motor, preferably a Lavet motor, the rotor whereof is kinematically connected to the first and third wheels, in order to drive these wheels such that they rotate, the first and third wheels being mechanically coupled, in particular via a gear train.

Advantageously, the first and third wheels have the same diameter and each has a toothing with the same number of teeth, and the distance between these two wheels is more than four times, preferably more than eight times the diameter thereof. This virtually eliminates any parasitic magnetic interaction between the first and third wheels.

Preferably, the first wheel, respectively the third wheel, has a central part made of a ferromagnetic material, on the periphery whereof its said first permanent magnetic poles, respectively its said second permanent magnetic poles, are arranged in pairs respectively with as many complementary magnetic poles, thus forming bipolar magnets having radial magnetisation and defining the magnetised teeth of the first magnetic toothing, respectively of the third magnetic toothing. This enables the magnetic field lines between adjacent bipolar magnets to be effectively closed via the central part of the first wheel, respectively of the third wheel.

Advantageously, the second wheel comprises a rim, forming a continuous circular base for the second magnetic toothing which emerges from this rim, and which is made of a soft ferromagnetic material so as to form a closure for magnetic paths of said first magnetic fluxes and of said second magnetic fluxes passing through the second toothing.

According to one specific example embodiment of the invention, the first, second and third wheels are coplanar. According to another specific example embodiment of the invention, the first, second and third wheels can extend in separate planes.

Advantageously, the mechanism further comprises, for each of the first and third wheels, a soft ferromagnetic element or a set of soft ferromagnetic elements arranged relative to this wheel so as to generate a magnetic compensating torque to compensate for, at least for the most part, a magnetic positioning torque to which each of the first and third wheels are individually subjected and resulting from the magnetic coupling of this wheel with the second magnetic toothing of the second wheel. The aforementioned magnetic positioning torque has a periodic variation in intensity as a function of the angular position of the wheel concerned relative to the reference half-axis starting from the rotational axis of the second wheel and intercepting the rotational axis of this wheel. The ferromagnetic element or the set of ferromagnetic elements is advantageously arranged so as to generate a magnetic compensating torque which also has a periodic variation in intensity as a function of the angular position of the wheel concerned relative to the reference half-axis associated with this wheel, the magnetic compensating torque and the individual magnetic positioning torque preferably having a 180° phase shift.

The presence of a soft ferromagnetic element or a set of soft ferromagnetic elements so configured overcomes, virtually for the most part, the issue concerning the magnetic positioning force couple to which each of the first and third wheels are subjected, by eliminating for the most part this parasitic torque and thus minimising the overall positioning torque to which the second wheel and jointly the first and third wheels are subjected. More specifically, the variation in the magnetic coupling causes, for each of the first and third wheels, when they are drive wheels in the magnetic gear, a variation in the mechanical torque provided by a motor device. The presence of such a ferromagnetic element or of such a set of ferromagnetic elements thus allows the amplitude of this variation for each of the first and third wheels to be reduced, without this having any appreciable repercussion on the magnetic coupling in the magnetic gear. In other words, 'smoothing' the mechanical torque to be supplied to the first and third wheels hardly modifies the variation in the magnetic coupling between the second wheel and the first and third wheels, this variation being a function of the angular position of the second toothing relative to the magnetic poles of the first wheel, respectively of the third wheel, this last variation being significantly compensated by the arrangement of the magnetic gear according to the invention.

It should be noted that the magnetic gear according to the invention further allows for a significant reduction in the overall positioning torque by the arrangement of the first and third wheels thanks to the angular offset $\alpha$ and phase shift provided between these first and third wheels, which have been described hereinabove. More specifically, the arrangement of the advantageous alternatives concerning the angular offset $\alpha$ and the phase shift, and more particularly the optimum values identified for these two parameters, results in the second wheel being subjected to two magnetic positioning torques, generated respectively by the first and third wheels, being out of phase, such that the overall positioning torque to which the second wheel is subjected is much lower than in the case of the prior art, i.e. without the third wheel. In particular in the case where the first and third wheels are integral with one another such that they rotate together, this set of two wheels is also subjected as a whole to a lower positioning torque, which is thus substantially equal to the overall positioning torque exerted on the second wheel. It can thus be seen that the magnetic gear according to the invention effectively solves the two main issues identified in the prior art embodiment described in the technological background, enabling this magnetic gear to transmit, in a stable and safe manner, a greater mechanical torque with a lower motor torque.

The invention further relates to a timepiece, in particular a wristwatch, including the mechanism of the invention.

BRIEF DESCRIPTION OF THE FIGURES

The purposes, advantages and features of the mechanism according to the invention will appear more clearly in the following description of various non-limiting embodiments shown by way of the drawings, in which.

DETAILED DESCRIPTION OF THE INVENTION

Figure 1:
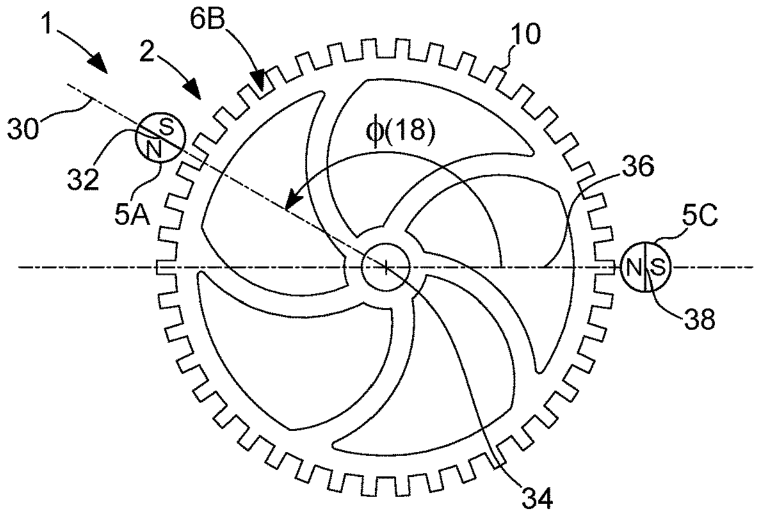
FIG. 1 is a top view of a mechanism incorporating a magnetic gear according to a specific alternative embodiment of the invention.

FIG. 1 shows a specific alternative embodiment of the mechanism 1 according to the invention, in particular of the timepiece type, comprising a magnetic gear 2 to expose the general concept of the invention. The present invention provides a magnetic gear 2 including two wheels, in particular of small diameter and having dimensions specific to a pinion, each provided with permanent magnetic poles which are arranged circularly around the rotational axis 32, 38 of the respective wheel, these two wheels being magnetically coupled to another wheel 6B, in particular of larger diameter, provided with teeth made of a soft ferromagnetic material with relatively high magnetic permeability. Either the two small wheels are drive wheels and the large wheel is driven, or the opposite is true. In FIG. 1, each of the two small wheels are formed by a single rotating element 5A, 5C formed by a circular bipolar magnet 5A, 5C (in the form of a disc) with a central rotational axis 32, 38 that is perpendicular to the magnetic axis of this bipolar magnet. It should be noted that the bipolar magnet can have another shape, in particular a rectangular shape. Each bipolar magnet 5A, 5C produces a magnetic field which is coupled to the large wheel 6B in one respective region of this large wheel defining a respective magnetic coupling zone with the corresponding rotating bipolar magnet. The two rotating bipolar magnets 5A, 5C thus each magnetically mesh with the wheel 6B, which is preferably a wheel of larger diameter, advantageously located between the two bipolar magnets. Each rotating bipolar magnet 5A, 5C generates magnetic fluxes allowing the magnetic toothing of the wheel 6B to be momentarily and locally, magnetically polarised.

The magnetic field generated by each of the rotating bipolar magnets 5A, 5C thus produces a local and temporary magnetisation on the wheel 6B, more specifically in teeth made of a soft ferromagnetic material of this wheel 6B which are active at a given moment in time, i.e. which are momentarily located in a magnetic meshing zone which corresponds by definition to the magnetic coupling zone provided between the wheel 6B and the bipolar magnet concerned. The number of permanent magnetic poles of each of the wheels illustrated by the rotating element 5A, 5B, which are required to generate such a local magnetisation, is reduced to at least two magnetic poles forming a bipolar magnet.

The magnetic gear 2 defines a first reference half-axis 30 starting from the rotational axis 34 of the larger diameter wheel 6B and intercepting the rotational axis 32 of a first of the two smaller wheels, illustrated in FIG. 1 by a first rotating bipolar magnet 5A. The magnetic gear 2 further defines a second reference half-axis 36 starting from the rotational axis 34 of the wheel 6B and intercepting the rotational axis 38 of the second small wheel, illustrated in FIG. 1 by a second rotating bipolar magnet 5B. The first reference half-axis 30 and the second reference half-axis 36 have a given angle $\phi$ therebetween. As shown in FIG. 1, the angle $\phi$ separating the first and second reference half axes 30, 36 is measured from the second reference half axis 36.

Figure 2:
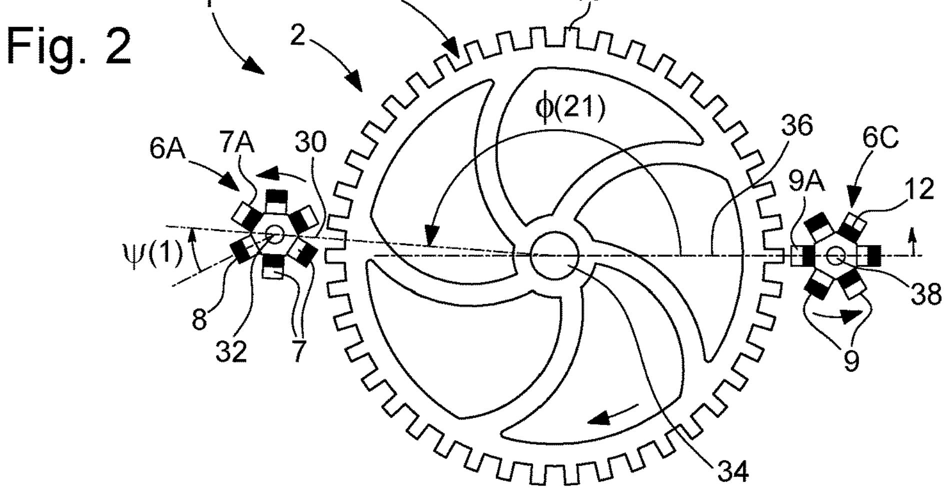
FIG. 2 is a top view, similar to FIG. 1, of a first embodiment of the mechanism according to the invention, the magnetic gear of the mechanism comprising two small wheels and one larger wheel.

As shown in FIG. 2, and in FIGS. 5 to 9, the magnetic gear 2 includes three wheels 6A, 6B, 6C. Generally speaking, a first wheel 6A and a third wheel 6C, which are smaller in diameter than the second wheel 6B, are each provided with N1 permanent magnetic poles 7, 9 which are arranged in a circle and define a first magnetic toothing 8, respectively a third magnetic toothing 12. Preferably, as in FIG. 2 and in FIGS. 7 to 9, the first and third wheels 6A, 6C are disposed substantially on either side of the second wheel 6B, the second wheel 6B thus being arranged substantially between the first and third wheels 6A, 6C. Also preferably, the first and third wheels 6A, 6C are drive wheels and the second wheel 6B is driven by these two wheels such that it rotates. The three wheels 6A, 6B, 6C can be coplanar or extend in separate planes.

The N1 permanent magnetic poles 7, 9 form the magnetised teeth of the first magnetic toothing 8, respectively of the third magnetic toothing 12, from which first magnetic fluxes, respectively second magnetic fluxes of alternating polarities respectively emerge. As the magnetic poles are arranged in a circular manner with alternating polarisation, there is an even number thereof. Preferably, the number N1 is an even number between four and ten, inclusive. The magnetic poles 7, 9 of the first wheel 6A, respectively of the third wheel 6C, are typically arranged in pairs with the same number of complementary magnetic poles, located around a central part 32, 38 forming the axis of the wheel 6A, 6C or in an opening through which such an axis passes, these pairs of magnetic poles thus forming bipolar magnets which define, by the outer poles thereof, the magnetised teeth of the first magnetic toothing 8, respectively of the third magnetic toothing 12. In the event that the plurality of bipolar magnets have radial magnetisation, the central part 32, 38 is advantageously made of a ferromagnetic material or a mu-metal material. Such a material effectively closes the lines of the magnetic fields emerging from the inner magnetic poles of the plurality of bipolar magnets, in particular between adjacent bipolar magnets, via the central part of the first wheel 6A, respectively of the third wheel 6C. In the specific example embodiments shown in FIG. 2, and in FIGS. 5 to 9, each of the first and third wheels 6A, 6C comprises six bipolar magnets 7, 9 respectively forming the six magnetised teeth of the first magnetic toothing 8, respectively of the third magnetic toothing 12. Preferably, as shown in FIGS. 2, 5, 7 and 9, the magnetised teeth 7, 9 of the first toothing 8, respectively of the third toothing 12, are arranged such that the first magnetic fluxes, respectively the second magnetic fluxes, emerge from these magnetised teeth 7, 9 in a main direction which is radial relative to the rotational axis of the first wheel 6A, respectively of the third wheel 6C, the bipolar magnets thus having radial magnetisation.

The second wheel 6B is provided with N2 teeth made of a soft ferromagnetic material defining a second magnetic toothing 10. The second wheel 6B comprises an annular rim made of a magnetic material, typically made of a soft ferromagnetic material, from which emerge forty-two teeth also made of a soft ferromagnetic material forming the second magnetic toothing 10. Such an annular rim thus forms a continuous circular base for the second magnetic toothing 10, via which the magnetic paths of the first and second interacting magnetic fluxes provided by the first and third magnetic toothings 8, 12, respectively, are closed.

At any time, one of the permanent magnetic poles 7A of the first wheel 6A has a first angular position relative to the first reference half-axis 30, and one of the permanent magnetic poles 9A of the third wheel 6C has a second angular position relative to the second reference half-axis 36. The magnetic gear 2 is arranged such that, at all times, the first and third wheels 6A, 6C are angularly positioned, relative to the respective reference half-axes thereof, such that the first and second angular positions have an angular difference $\psi$ which is constant. The angles $\phi$ and $\psi$ are selected, in general, so as to determine the value of a maximum mechanical torque that can be transferred in the magnetic gear without the risk of slippage in this magnetic gear. In particular, the angles $\phi$ and $\psi$ are advantageously selected such that the maximum mechanical torque that can be transferred without possible slippage in the magnetic gear 2 is more than twice a corresponding maximum mechanical torque that can be transferred by another magnetic gear including only the first wheel 6A and the second wheel 6B. FIG. 3A to 4B, which will be described hereinafter, illustrate such values for the angles $\phi$ and $\psi$.

In an advantageous alternative, the first and third wheels 6A, 6C are angularly positioned relative to the second wheel 6B such that the angle $\phi$ satisfies the following mathematical relationship (1):

$$\left(N-\frac{2}{3}\right)\cdot\frac{360^\circ}{N2}\leq\Phi=\Phi(N)\leq\left(N-\frac{1}{3}\right)\cdot\frac{360^\circ}{N2}\qquad(1)$$

where N is a positive integer less than N2 (N is thus any integer between 1 and N2−1, i.e. N=1, 2, . . . , N2−1).

Figure 3A:
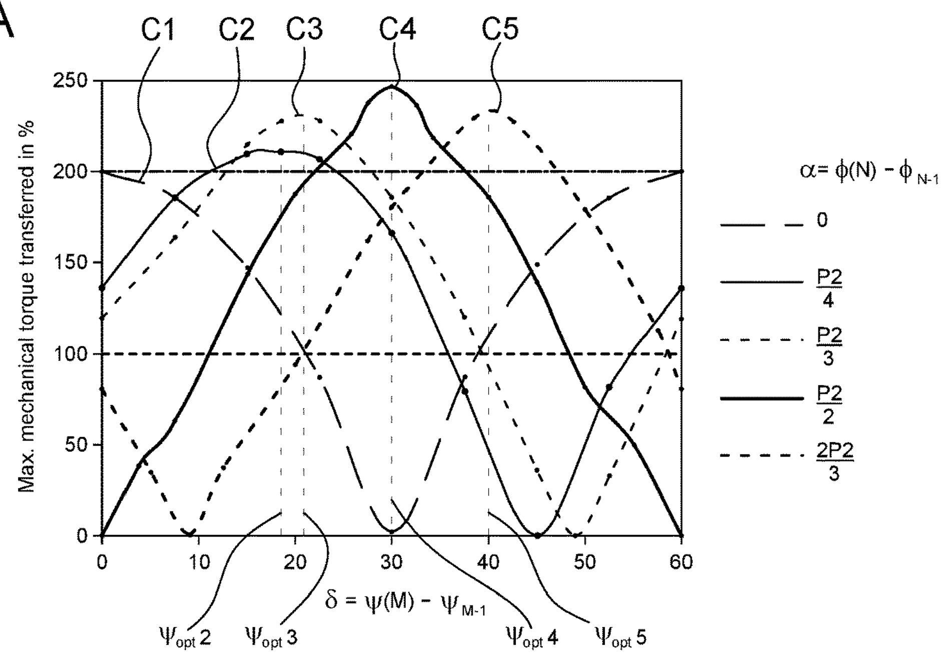
FIG. 3A is a set of several graphs representing the evolution of a maximum mechanical torque that can be transferred in the magnetic gear as a function of an angular phase shift between the two small wheels of the mechanism in FIG. 2, for different values of an angular offset of the two small wheels relative to the rotational axis of the large wheel.

This selection for the angle $\phi$ is the result of several simulations which have given, in particular, the different curves C1, C2, C3, C4 and C5 plotted in FIG. 3A, which represent the evolution of the maximum mechanical torque that can be transferred in the magnetic gear 2 (as a %), for different values of the angular offset $\alpha=\phi(N)-\phi_{N-1}$, as a function of the angular phase shift $\delta=\psi(M)-\psi_{M-1}$. The magnetic period $P_2$ of the second wheel 6B is defined as being equal to 360°/N2, and the magnetic period $P_1$ of each of the first and third wheels 6A, 6C is defined as being equal to 360°/N1. The angle $\phi_{N-1}$ is defined as being equal to $(N-1)\cdot P_2$ and the angle $\psi_{M-1}$ is defined as being equal to $(M-1)\cdot P_1$, where M is a positive integer less than N1 (M is thus any integer between 1 and N1−1, i.e. M=1, 2, . . . , N1−1). The angular offset $\alpha$ is comprised between $\phi_{N-1}$ and $\phi_N$, where $\omega_N$ is equal to $N\cdot P_2$, and the angular phase shift $\delta$ is comprised between $\psi_{M-1}$ and $\psi P_M$, where $\psi_M$ is equal to $M\cdot P_1$. Thus, the angular offset $\alpha$ is equal to $\phi(1)$. The mathematical relationship (1) is equivalent to the relationship $P_2/3\leq\alpha\leq 2\cdot P_2/3$ for the angular offset.

The curves C1, C2, C3, C4 and C5 represent the evolution of the maximum mechanical torque that can be transferred in the magnetic gear 2 (as a %) as a function of the angular phase shift $\delta$, when the angular offset $\alpha$ is equal to zero, $P_2/4$, $P_2/3$, $P_2/2$ and $2P_2/3$ respectively. The curves C3 and C5 are selected for the lower and upper bounds of the previous mathematical relationship (1) and of the equivalent aforementioned relationship. As can be seen from the curves C2, C3, C4 and C5, for certain ranges of the angular phase shift, the maximum mechanical torque that can be transferred without sliding in the magnetic gear 2, is more than twice a corresponding maximum mechanical torque that can be transferred by another magnetic gear including only the first wheel 6A and the second wheel 6B. A good symmetry can be seen between the curves C3 and C5 relative to the mid-point angular phase shift $P_1/2$, which is easily explained since these two situations are magnetically equivalent for the magnetic gear. This explains why the mathematical relationship (1) has lower and upper bounds corresponding to lower and upper angular offsets located at the same distance from the mid-point angular offset. The best results are obtained for the C4 curve corresponding to the mid-point angular offset $P_2/2$.

Preferably, and in view of FIG. 3A (and in particular of the curve C4 which gives the best results in terms of maximum transferable mechanical torque for certain values of the angular phase shift), the value of the angle $\phi(N)$ is selected such that it is substantially equal to $$\left(N-\frac{1}{2}\right)\cdot 360/N2,$$

which corresponds to the mid-point angular offset $P_2/2$. More specifically, the highest maximum transferable mechanical torque is obtained for the combination of the mid-point angular offset $P_2/2$ with the mid-point angular phase shift $P_1/2$.

In the specific case illustrated in FIG. 1, where N1 is eighteen and where the number N2 of teeth of the second magnetic toothing 10 is equal to forty-two, the angle $\phi$(18) is preferably equal to 150 degrees. In the specific case illustrated in FIG. 2, where N is twenty-one and where the number N2 of teeth of the second magnetic toothing 10 is equal to forty-two, the angle $\phi$(21) is preferably equal to 175.7 degrees. As illustrated by the fourth curve C4 in FIG. 3A, for a number N1 of teeth of the first magnetic toothing 8 and of the third magnetic toothing 12 equal to six teeth, the preferred values (in terms of maximum transferable mechanical torque for the gear 2) of the angular phase shift $\delta$ are located around the optimum value of 30 degrees (this latter value for the optimum angular phase shift $\delta$ being denoted as $\psi_{opt}4$).

In an advantageous alternative, and independently of the preceding mathematical relationship (1) (in other words when beginning by selecting the value of the angle $\psi$ before that of the angle $\phi$), the first and third wheels 6A, 6C are angularly positioned, respectively to the respective half-axes 30 and 36, such that the angular difference L satisfies the following mathematical relationship (2):

$$\left(M-\frac{2}{3}\right)\cdot\frac{360^\circ}{N1}\leq\Psi=\Psi(M)\leq\left(M-\frac{1}{3}\right)\cdot\frac{360^\circ}{N1}\qquad(2)$$

Figure 3B:
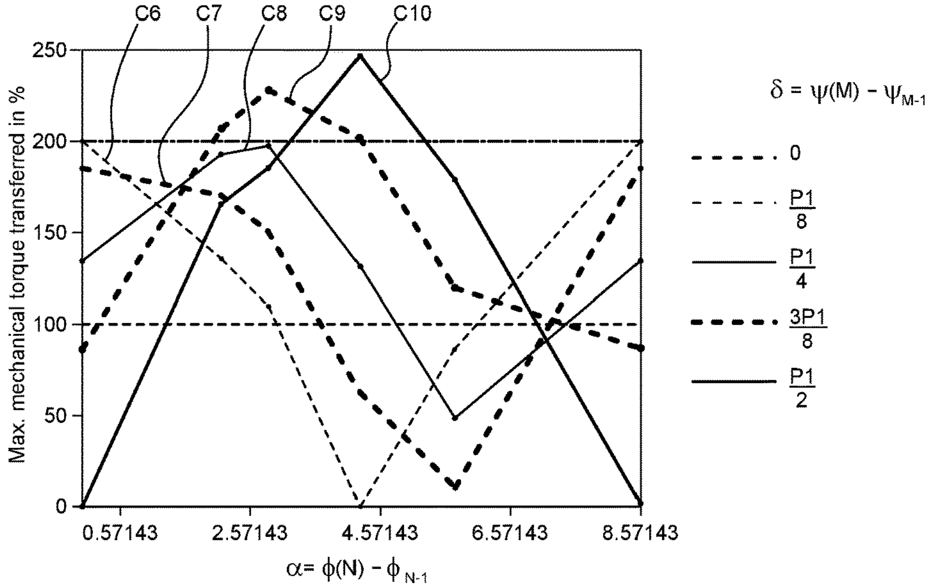
FIG. 3B is a set of several graphs representing the evolution of a maximum mechanical torque that can be transferred in the magnetic gear as a function of an angular offset between the two small wheels of the mechanism in FIG. 2, for different values of the angular phase shift between the two small wheels.

Different curves C6, C7, C8, C9 and C10 are plotted in FIG. 3B, which represent the evolution of the maximum mechanical torque that can be transferred in the magnetic gear 2 (as a %), for different values of the angular phase shift $\delta=\psi(M)-\psi_{M-1}$, as a function of the angular offset $\alpha=\phi(N)-\phi_{N-1}$. It should be noted that the angular phase shift $\delta$ is equal to $\psi(1)$. The mathematical relationship (2) is equivalent to the relationship $P_1/3\leq\delta\leq 2\cdot P_1/3$ for the angular phase shift.

The curves C6, C7, C8, C9 and C10 represent the evolution of the maximum mechanical torque that can be transferred in the magnetic gear 2 (as a %) as a function of the angular offset, when the angular phase shift is equal to zero, $P_1/8$, $P_1/4$, $3P_1/8$ and $P_1/2$ respectively. As can be seen from the curves C9 and C10, for certain ranges of the angular offset, the maximum mechanical torque that can be transferred without slippage in the magnetic gear 2, is more than twice a corresponding maximum mechanical torque that can be transferred by another magnetic gear including only the first wheel 6A and the second wheel 6B (with the best results being obtained for the curve C10 corresponding to a mid-point angular phase shift $P_1/2$).

Preferably, and in view of FIG. 3B (and in particular of the curve C10 which gives the best results in terms of maximum transferable mechanical torque for certain values of the angular offset), the value of the angular difference $\psi(M)$ is selected such that it is substantially equal to $$\left(M-\frac{1}{2}\right)\cdot 360/N1,$$

which corresponds to an optimum angular phase shift $\delta=P_1/2$. Thus, in the specific case illustrated in FIG. 2, where M is '1' and where the number N1 of teeth of the first magnetic toothing 8 and of the third magnetic toothing 12 is equal to '6', the angle $\psi(1)$ is preferably equal to 30 degrees. This corresponds to an optimum angular phase shift $\delta=30°$. As illustrated by the curve C10 in FIG. 3B, for a number N2 of teeth of the second magnetic toothing 10 equal to '42', the preferred values (in terms of maximum transferable mechanical torque for the gear 2) for the angular offset $\alpha$ are located around the optimum angular offset $P_2/2$, equal to approximately 4.286 degrees.

Figure 4A:
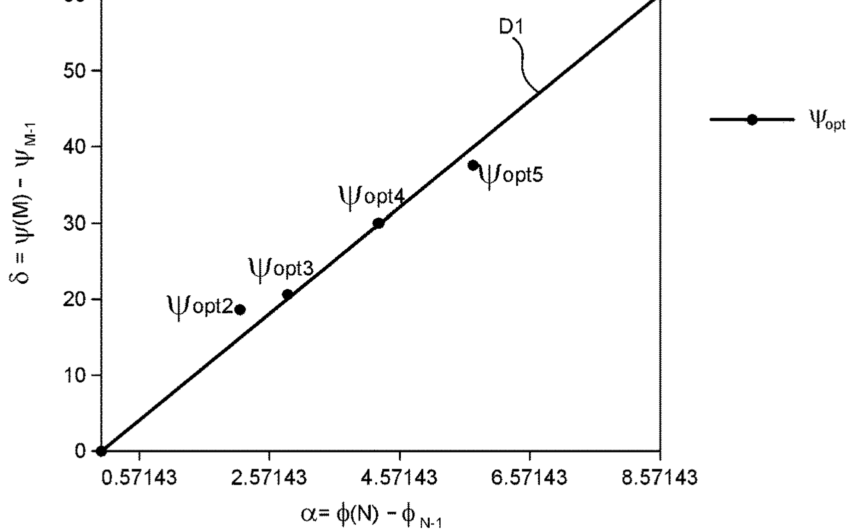
FIG. 4A is a graph showing the evolution of an optimum angular phase shift for the two small wheels of the mechanism in FIG. 2, as a function of an angular offset between these two small wheels.

FIG. 4A graphically shows four points ψopt2, ψopt3, ψopt4 and ψopt5 corresponding to the respective abscissae of the peaks of the curves C2, C3, C4 and C5 in FIG. 3A, i.e. to the optimum angular phase shifts, for the different values of the angular offset $\alpha$ corresponding to these four curves. It should be noted that in FIG. 4A, a quasi-linear function is obtained for the optimum angular phase shifts as a function of the angular offset. The theoretical curve is a linear straight line D1 which indicates that for an angular offset $X \cdot P2$ (where X is comprised between 0 and 1) over the period P2 of the magnetic toothing of the second wheel 6B, the optimum angular phase shift is $X \cdot P1$ over the period P1 of the magnetic toothings of the first and third wheels 6A, 6C. Thus, the relationship $\delta=(P1/P2)\cdot\alpha$ exists on this theoretical linear straight line D1.

Figure 4B:
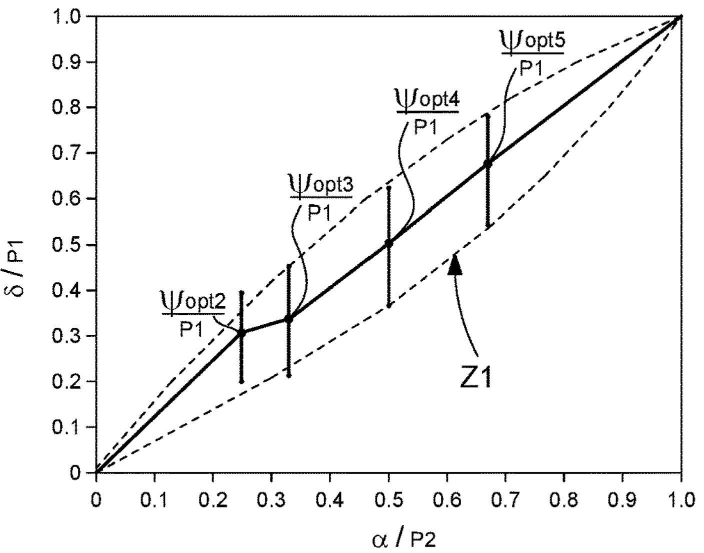
FIG. 4B is a graph, similar to that of FIG. 4A, representing the evolution of an optimum phase shift, expressed on a scale of zero to one, for the two small wheels of the mechanism in FIG. 2, as a function of an offset, also expressed on a scale of zero to one, between these two small wheels, as well as a zone for these two parameters giving a relatively high maximum mechanical torque transferred in the magnetic gear.

FIG. 4B gives a graphical representation similar to that of FIG. 4A but with different scales for the coordinates, namely a graph of the angular phase shift divided by the period P1, i.e. $\delta/P1$, as a function of the angular offset divided by the period P2, i.e. $\alpha/2$. In addition to a curve connecting the various optimum values, this FIG. 4B shows a zone of value couples Z1 for which a maximum mechanical torque that can be transferred in the magnetic gear of substantially greater than two is obtained. This diagram can be read as follows: once an angular phase shift or an angular offset has been selected, the advantageous range for the other of these two parameters lies on either side of an optimum value for this other parameter, over a certain range of values which varies depending on this other parameter.

In the description hereinbelow, elements denoted by the same reference numerals are analogous. Without this being limiting within the scope of the present invention, the mechanism 1 is preferably a timepiece mechanism.

A first embodiment of the mechanism 1 comprising a magnetic gear 2 according to the invention will be described hereinbelow with reference to FIG. 2. According to this first embodiment of the mechanism 1, the mechanism 1 includes two motors (these two motors are not shown in FIG. 2 for clarity purposes). The first, second and third wheels 6A, 6B, 6C extend in the same general plane.

The rotor of a first motor, respectively of a second motor, is kinematically connected to the first wheel 6A, respectively to the third wheel 6C, in order to drive this wheel such that it rotates. Each motor is, for example, a Lavet motor provided with a reducer gear. The two motors are configured to drive the first and third wheels 6A, 6C simultaneously. More specifically, the two motors are configured to simultaneously drive the first and third wheels 6A, 6C such that the first and second angular positions remain permanently out of phase by the angle ψ(M) defined via the mathematical relationship (2) given hereinabove. In this first embodiment of the mechanism 1, the first and third wheels 6A, 6C are drive wheels in the magnetic gear 2.

A second embodiment of the mechanism 1 comprising a magnetic gear 2 according to the invention will be described hereinbelow with reference to FIGS. 5 to 9. According to this second embodiment of the mechanism 1, the mechanism includes a single motor (not shown in the figures for clarity purposes). The first, second and third wheels 6B, 6C, 6A extend in the same general plane. The first and third wheels 6A, 6C are mechanically coupled, typically via a gear train 14, and are driven by the motor such that they rotate. Preferably, and as shown in FIGS. 5 to 9, the first and third wheels 6A, 6C have the same diameter and the same number of teeth in the respective magnetic toothings thereof. The distance between the first wheel 6A and the third wheel 6C is advantageously more than four times, preferably more than eight times the diameter of each of these two wheels.

The rotor of the motor is kinematically connected to at least one of the first and third wheels 6A, 6C or to a complementary wheel belonging to the gear train 14, in order to simultaneously drive these first and third wheels such that they rotate. The motor is preferably a Lavet motor or a continuous-rotation horological motor.

Figure 5:
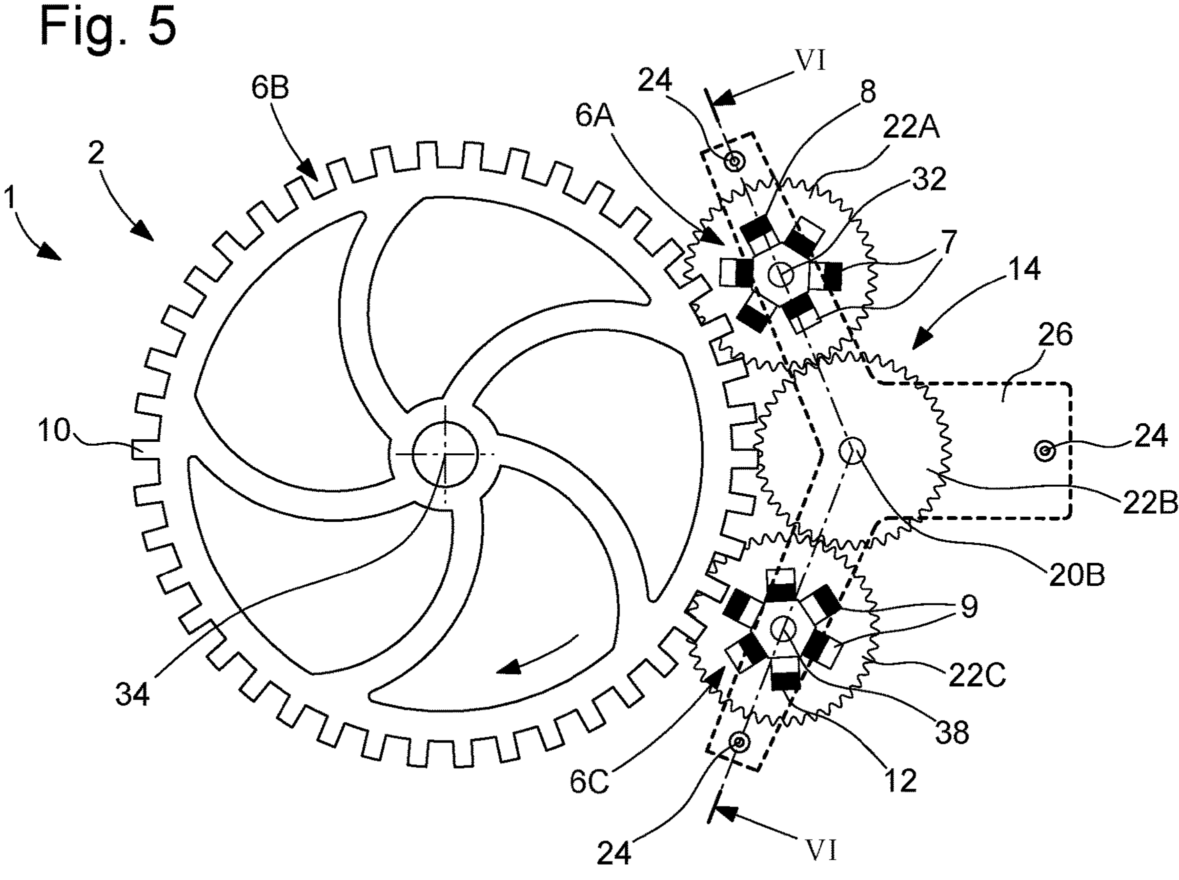
FIG. 5 is a top view of a first alternative to a second embodiment of the mechanism of the invention.
Figure 6:
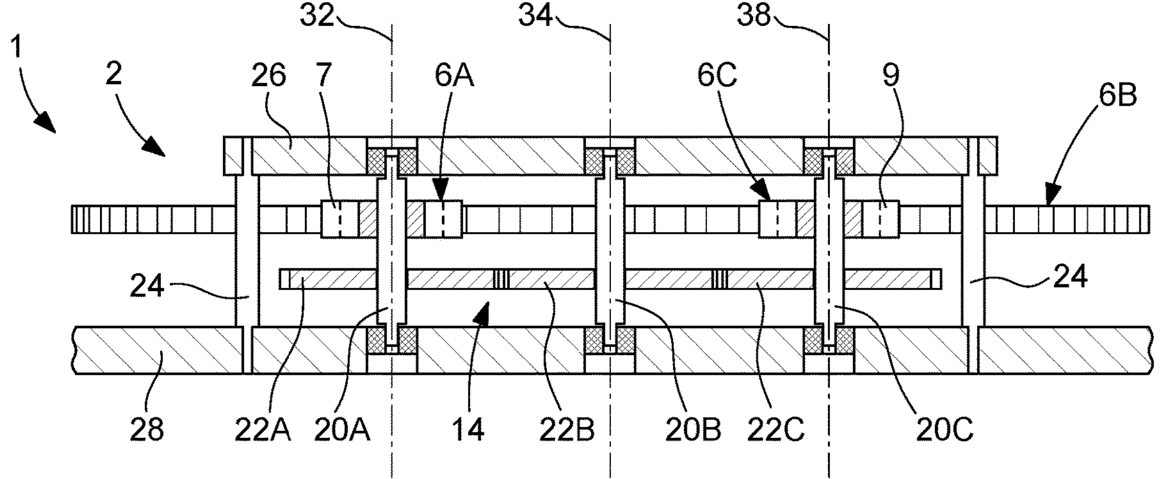
FIG. 6 is a cross-sectional view of the mechanism in FIG. 5, taken along the cutting plane VI-VI.

According to a first alternative to the second embodiment of the mechanism 1, shown in FIGS. 5 and 6, the rotor of the motor is connected to a gear train 14 mechanically coupling the first and third wheels 6A, 6C, in order to simultaneously drive the first and third wheels via the gear train such that they rotate. The gear train 14 is connected to the shaft 20A, 20C of each of the first and third wheels 6A, 6C, for the mechanical coupling of these wheels. According to the example shown in FIG. 6, the gear train 14 consists of three wheels 22A, 22B, 220; a central wheel 22B being, for example, connected to the motor and mechanically coupling the other two wheels 22A, 22C. The central wheel 22B is mounted on a central shaft 20B. Each of the other two wheels 22A, 22C is coaxially mounted on the respective shaft 20A, 20C of one of the first and third wheels 6A, 6C. Pins 24 placed on the side of the mechanism 1 allow a bridge 26 to be attached to the plate 28. In this first alternative to the second embodiment, the first and third wheels 6A, 6C are drive wheels in the magnetic gear 2. In another alternative, the second wheel is a drive wheel and the first and third wheels are driven.

Figures 7, 8, 9:
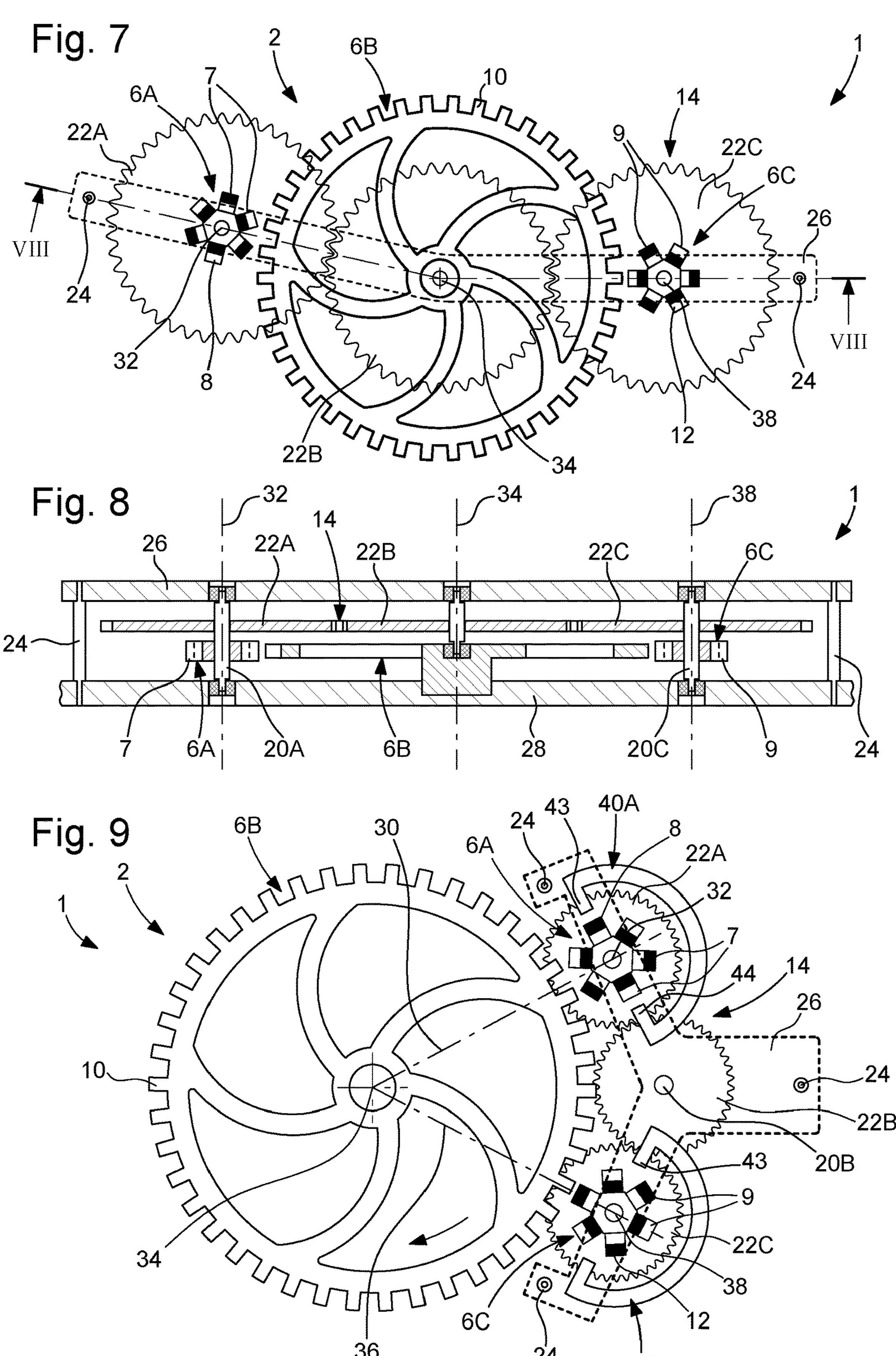
FIG. 7 is a top view of a second alternative to the second embodiment of the mechanism of the invention.
FIG. 8 is a cross-sectional view of the mechanism in FIG. 7, taken along the cutting plane VIII-VIII.
FIG. 9 is a similar view to that in FIG. 5, according to an enhanced alternative to the second embodiment of the mechanism of the invention.

A second alternative to the second embodiment of the mechanism 1, shown in FIGS. 7 and 8, differs essentially from the first alternative in two main respects. Firstly, the first and third wheels 6A, 6C are separated from one another as much as possible in order to limit the magnetic interaction therebetween. They are arranged substantially on either side of the second wheel 6B (large wheel), i.e. they are substantially aligned with a diameter of this second wheel. Thus, the radial magnetic forces acting on the second wheel 6B are advantageously substantially balanced. Secondly, the mechanism 1 includes a pivot bearing for the wheel 22B of the gear train 14 which is aligned with the rotational axis 34 of the second wheel 6B and which is carried by a central part of this second wheel 6B, which does not have its own bearing on the gear 22B side.

According to an improved alternative to the first alternative to the second embodiment of the mechanism 1, shown in FIG. 9, the mechanism 1 further comprises, for each of the first and third wheels 6A, 6C, a ferromagnetic element 40A, 40C arranged relative to this wheel 6A, 6C so as to optimally compensate for, and cancel out, at least for the most part, the parasitic magnetic torque to which this wheel 6A, 6C is individually subjected. More specifically, as already explained hereinabove, each of the first and third drive wheels 6A, 6C is subject to a parasitic magnetic torque (referred to as a positioning torque).

The ferromagnetic element 40A, respectively 40C, is preferably arranged in the general plane of the first and third wheels 6A and 6C, which is identical here to that of the second wheel 6B. This ferromagnetic element 40A, 40C comprises two end parts 43 and 44 which extend towards the magnetic toothing 8, respectively 12, of the first wheel 6A, respectively of the third wheel 6C. In general, each of the end parts 43, 44 is positioned at an angle, relative to the first reference half-axis 30, respectively to the second reference half-axis 36, the value whereof is substantially equal to (J−½)·360/N1, i.e. (J−½)·P1, where J is an integer '1' and N1 is different for each end part. It should be noted that, in a more complex alternative, other projecting parts, in addition to the two end parts, can be provided, each positioned at a different angle from among the plurality of angles defined by the value J between '1' and N1 in the aforementioned mathematical formula. An intermediate part 46 connects the two end parts 43, 44. This intermediate part 46 has a semicircular shape that extends, in the general plane of the first and third wheels 6A, 6C, on the side opposite the second wheel 6B. It should be noted that this intermediate part 46 is dimensioned to generate a low magnetic torque on the first wheel 6A, respectively on the third wheel 6C, which is much lower than the individual magnetic positioning torque and the magnetic compensating torque generated as a whole by the ferromagnetic element 40A, respectively 40C, and mainly by the two end parts 43 and 44 which are arranged facing inwards towards the toothing 8, respectively 12, of the first wheel 6A, respectively of the third wheel 6C, relative to the circle defined by the intermediate part 46.

The ferromagnetic element 40A, respectively 40C, is arranged so as to generate a magnetic compensating torque, of the same period as the periodic variation in intensity of the parasitic magnetic torque, as a function of the angular position of the first wheel 6A, respectively of the third wheel 6C, relative to the first reference half-axis 30, respectively to the second reference half-axis 36. Advantageously, as shown, the magnetic compensating torque and the parasitic magnetic torque (positioning torque) have a phase shift of substantially 180°. Preferably, the ferromagnetic element 40A, respectively 40C, is configured such that the maximum intensity (amplitude) of the magnetic compensating torque is substantially equal to that of the magnetic positioning torque.

According to an improvement, the ferromagnetic element 40A, respectively 40C, is configured in such a way as to generate on the first wheel 6A, respectively on the third wheel 6C, as a whole, a magnetic compensating attraction force which is aligned with the first reference half-axis 30, respectively with the second reference half-axis 36, the direction whereof opposes that of a radial magnetic attraction force exerted as a whole by the second wheel 6B on the first wheel 6A, respectively on the third wheel 6C. It should be noted that the alternative illustrated in FIG. 9 already has a small magnetic compensating attraction force resulting from the semicircular intermediate part, but this intermediate part mainly serves to form a magnetic circuit of low magnetic reluctance between the two end parts 43 and 44 and the magnetic attraction force thereof on the first wheel 6A, respectively on the third wheel 6C, is much less than the radial magnetic attraction force exerted by the second wheel 6B on this first wheel 6A, respectively on this third wheel 6C, these two attraction forces not being of the same order of magnitude. Different specific embodiments can be considered in order to achieve this improvement, in particular by wisely selecting the two values for the aforementioned parameter J and/or by adding a third part facing inwards towards the wheel considered and/or by configuring the intermediate part differently.

It should be noted that, although such a configuration including ferromagnetic elements 40A, 40C has been described with reference to the first example of the second embodiment of the mechanism 1, this configuration equally applies to the first embodiment as well as to the second alternative to the second embodiment of the mechanism 1, while still remaining within the scope of the present invention.

By way of example and in a non-limiting manner, results for the maximum mechanical torque that can be transferred in the gear 2 have been obtained by the inventors in the form of numerals. These numerals were obtained for a number N1 of teeth equal to six and for a number N2 of teeth equal to forty-two. For another magnetic gear including only the first wheel 6A and the second wheel 6B, the maximum mechanical torque that can be transferred in the gear is equal to 93 μNm. For the magnetic gear 2 according to the invention, for an angular offset value $\alpha$ equal to zero degrees and for an angular phase shift value $\delta$ equal to zero degrees, the maximum mechanical torque that can be transferred in the gear 2 is equal to 186 μNm. This value corresponds to exactly double the value obtained for the magnetic gear including only the first wheel 6A and the second wheel 6B, which was expected. For an optimum angular offset value $\alpha$, equal to 4.286 degrees, and for an optimum angular phase shift value $\delta$, equal to 30 degrees, the maximum mechanical torque that can be transferred in the gear 2 is approximately equal to 227 μNm (which corresponds to an increase of more than 20% compared to the case where $\alpha=\delta=0°$).

The invention claimed is:

1. A timepiece mechanism, comprising a magnetic gear (2) including a first wheel (6A) and a second wheel (6B), the first (6A) wheel being provided with first permanent magnetic poles (7) which are arranged so as to form the magnetised teeth of a first magnetic toothing (8) from which first magnetic fluxes having alternating polarities respectively emerge, the second wheel (6B) being provided with teeth made of a soft ferromagnetic material defining a second magnetic toothing (10), the first wheel (6A) and the second wheel (6B) being arranged such that the first magnetic toothing (8) has a first magnetic coupling with the second magnetic toothing (10) generated by said first magnetic fluxes which momentarily polarise, in magnetic attraction, teeth of the second magnetic toothing (10), which are momentarily located in a first magnetic coupling zone with the first magnetic toothing (8) and thus through which first magnetic fluxes from among said first magnetic fluxes respectively flow, such that the first and second wheels (6A, 6B) magnetically mesh with one another, the magnetic gear (2) defining a first reference half-axis (30) starting from the rotational axis (34) of the second wheel (6B) and intercepting the rotational axis (32) of the first wheel (6A);

wherein the magnetic gear (2) further comprises a third wheel (6C) provided with second permanent magnetic poles (9) which are arranged so as to form the magnetised teeth of a third magnetic toothing (12) from which second magnetic fluxes with alternating polarities respectively emerge, the third wheel (6C) and the second wheel (6B) being arranged such that the third magnetic toothing (12) has a second magnetic coupling with the second magnetic toothing (10) generated by said second magnetic fluxes which momentarily polarise, in magnetic attraction, teeth of the second magnetic toothing (10), which are momentarily located in a second magnetic coupling zone with the third magnetic toothing (12) and thus through which second magnetic fluxes from among said second magnetic fluxes respectively flow, such that the second and third wheels (6B, 6C) magnetically mesh with one another, the magnetic gear (2) defining a second reference half-axis (36) starting from the rotational axis (34) of the second wheel (6B) and intercepting the rotational axis (38) of the third wheel (6C), the first reference half-axis (30) and the second reference half-axis (36) having a given angle @ therebetween;

wherein the first permanent magnetic poles (7A) of the first wheel (6A) have a first phase relative to the first reference half-axis (30), and the second permanent magnetic poles (9A) of the third wheel (6C) have a second phase relative to the second reference half-axis (36), the magnetic gear (2) being arranged such that a phase shift between the first and third wheels, defined as the difference between said first and second phases, is constant at all times; and wherein the magnetic gear is configured, with said angle Φ and said phase shift, to transfer a mechanical torque in the magnetic gear without slippage occurring between the second wheel and the first and third wheels, that is higher than a maximum mechanical torque which can be transferred, without slippage occurring between the second wheel (6B) and the first wheel (6A), in a magnetic gear comprising the first wheel (6A) and the second wheel (6B) without the third wheel (6C).

2. The mechanism (1) according to claim 1, wherein said the mechanical torque by the magnetic gear comprising the first wheel (6A), the second wheel (6B) and the third wheel (6C) is more than twice the maximum mechanical torque by the magnetic gear comprising the first wheel (6A) and the second wheel (6B) without the third wheel (6C).

3. The mechanism according to claim 1, wherein the first magnetic toothing (8) and the third magnetic toothing (12) each include the same number N1 of teeth (7, 9); and wherein the first and third wheels (6A, 6C) are angularly positioned, relative to the rotational axis of the second wheel, in such a way that an angle Φ(N) satisfies the mathematical relationship:

$$\left(N-\frac{2}{3}\right)\cdot\frac{360^\circ}{N2}\leq\Phi=\Phi(N)\leq\left(N-\frac{1}{3}\right)\cdot\frac{360^\circ}{N2}$$

where N2 is the number of teeth in the second magnetic toothing (10), N is a positive integer less than N2, and the angle Φ(N) is said angle Φ as a function of N.

4. The mechanism according to claim 3, wherein the value of the angle Φ(N) is selected to be substantially equal to $$\left(N-\frac{1}{2}\right)\cdot\frac{360^\circ}{N2}$$

5. The mechanism according to claim 1, wherein the first magnetic toothing (8) and the third magnetic toothing (12) each include the same number N1 of teeth (7, 9), two specific teeth, a first of which respectively belonging to the first magnetic toothing and a second of which respectively belonging to the third magnetic toothing, having, relative to the respective first and second half-axes and at all times, a given constant angular difference Ψ; and wherein the first and third wheels (6A, 6C) are angularly positioned, relative to the respective first and second half-axes, such that the given constant angular difference Ψ satisfies the mathematical relationship:

$$\left(M-\frac{2}{3}\right)\cdot\frac{360^\circ}{N1}\leq\Psi=\Psi(M)\leq\left(M-\frac{1}{3}\right)\cdot\frac{360^\circ}{N1}$$

where M is a positive integer less than N1, and Ψ(M) is an angular difference as a function of M.

6. The mechanism according to claim 5, wherein the value of the angular difference Ψ(M) is selected to be substantially equal to $$\left(M-\frac{1}{2}\right)\cdot\frac{360^\circ}{N1}$$

7. The mechanism according to claim 1, wherein magnetised teeth of the first magnetic toothing (8) are arranged such that the first magnetic fluxes emerge from the magnetised teeth of the first magnetic toothing (8) in a first main direction which is radial relative to the rotational axis (32) of the first wheel (6A) and of the third wheel (6C), and wherein magnetised teeth of the third magnetic toothing (12) are arranged such that the second magnetic fluxes emerge from the magnetised teeth of the third magnetic toothing (12) in a second main direction which is radial relative to the rotational axis (38) of the third wheel (6C).

8. The mechanism according to claim 1, wherein the first and third wheels (6A, 6C) are drive wheels and the second wheel (6B) is driven.

9. The mechanism according to claim 8, further comprising two motors, the respective rotors of the two motors each being kinematically connected to a different wheel from among the first and third wheels (6A, 6C), in order to drive these first and third wheels such that they rotate as the drive wheels in the magnetic gear (2); and wherein the two motors are configured to be able to drive the first and third wheels (6A, 6C) at least in part simultaneously.

10. The mechanism according to claim 8, wherein the first and third wheels (6A, 6C) are mechanically coupled; and wherein the mechanism further includes one motor, the rotor whereof is kinematically connected to the first and third wheels (6A, 6C), in order to be able to drive these first and third wheels such that they rotate.

11. The mechanism according to claim 10, wherein a gear train (14) mechanically couples the first and third wheels (6A, 6C), the rotor driving this gear train and the first and third wheels (6A, 6C) such that they rotate.

12. The mechanism according to claim 1, wherein the first and third wheels (6A, 6C) are disposed substantially on either side of the second wheel (6B), the second wheel (6B) thus being arranged substantially between the first and third wheels (6A, 6C).

13. The mechanism according to claim 11, wherein the first and third wheels (6A, 6C) are disposed substantially on either side of the second wheel (6B), the second wheel thus being arranged substantially between the first and third wheels; and wherein the gear train (14) consists of three additional wheels (22A, 22B, 22C), first and second additional wheels (22A, 22C) from the three respectively being connected to the shafts (20A, 20C) of the first and third wheels, the third additional wheel (22B) mechanically coupling the first and second additional wheels; and wherein the mechanism (1) includes a guide bearing for the third additional wheel which is aligned with the rotational axis (34) of the second wheel (6B) and carried by this second wheel.

14. The mechanism according to claim 1, wherein the first wheel (6A) has a central part (32), made of a ferromagnetic material, and, on a periphery of the central part (32), said first permanent magnetic poles (7) are arranged in pairs respectively with as many complementary magnetic poles thus forming first bipolar magnets having radial magnetisation and defining magnetised teeth of the first magnetic toothing (8), and wherein the third wheel (6*c*), has a central part (38), made of the ferromagnetic material, and, on a periphery of the central part (38), said second permanent magnetic poles (9), are arranged in pairs respectively with as many complementary magnetic poles thus forming second bipolar magnets having radial magnetisation and defining magnetised teeth of the third magnetic toothing (12).

15. The mechanism according to claim 1, wherein the second wheel (6B) comprises a rim, the second magnetic toothing (10) is made of a soft ferromagnetic material so as to form a closure for magnetic paths of said first magnetic fluxes and of said second magnetic fluxes passing through the second toothing, the rim comprises a continuous circular base, and the second magnetic toothing (10) is projected from the continuous circular base of the rim.

16. The mechanism according to claim 8, further comprising, at each of the first and third wheels (6A, 6C), a soft ferromagnetic element or a set of soft ferromagnetic elements configured to compensate for an individual magnetic positioning torque to which each of the first and third wheels are subjected and resulting from the magnetic coupling with the second magnetic toothing (10) of the second wheel (6B), the individual magnetic positioning torque to which each of the first and third wheels are subjected having a periodic variation in intensity as a function of the angular position relative to the reference half-axis (30, 36) starting from the rotational axis (34) of the second wheel (6B) and intercepting the rotational axis (32, 38).

17. The mechanism according to claim 16, wherein said ferromagnetic element or the set of ferromagnetic elements is arranged so as to generate a magnetic compensating torque which also has a periodic variation in intensity as a function of the angular position of the wheel (6A, 6C) relative to the reference half-axis (30, 36) intercepting the rotational axis (32, 38), the magnetic compensating torque and the individual magnetic positioning torque having a substantially 180° phase shift.

18. A wristwatch, comprising a mechanism (1) according to claim 1.

19. A wristwatch, comprising a mechanism (1) according to claim 3.

20. A wristwatch, comprising a mechanism (1) according to claim 4.

* * * * *